United States Patent Office 3,430,450
Patented Mar. 4, 1969

3,430,450
APPARATUS FOR REPLENISHING LIQUID HELIUM IN A CRYOSTAT FROM A STORAGE VESSEL
Günther Bogner, Erlangen, and Gustav Klipping, Berlin, Germany, assignors to Max-Planck-Gesellschaft zur Forderung der Wissenschaften e.V., Gottingen, and Siemens Aktiengesellschaft, Berlin, Germany, both German corporations
Filed July 25, 1967, Ser. No. 655,903
Claims priority, application Germany, July 29, 1966, M 70,402
U.S. Cl. 62—45     18 Claims
Int. Cl. F17c 7/02, 5/04

ABSTRACT OF THE DISCLOSURE

A helium siphon has one end in a storage vessel and its other end in a cryostat for transferring liquid helium from the storage vessel to the cryostat. An inlet valve at the other end of the helium siphon in the cryostat controls the flow of liquid helium into the cryostat. A superconducting magnetic coil device in operative proximity with the valve in the cryostat controls the operation of the valve in accordance with the conducting condition of the superconducting coil device, the conducting condition being determined by the level of liquid helium in the cryostat. An exhaust outlet including an overflow valve is in the storage vessel for maintaining a substantially constant overpressure therein.

Description of the invention

The present invention relates to apparatus for replenishing helium in a crystat. More particularly, the invention relates to replenishing liquid helium in a cryostat from a storage vessel.

A fluid or liquid cryostat with a helium bath has many uses for cooling specimens of various types and superconducting devices. To ensure proper and permanent operation of the cryostat, it is necessary to replenish the helium consumed during its operation. In some prior art apparatus, only helium baths boiling under reduced pressure are replenished. Such apparatus is described in an article by Nicol and Bohm in "Advances in Cryogenic Engineering," No. 5, 1960, pages 332 to 337, and in an article by Madden and Bohm in "Review of Scientific Instruments," No. 35, 1964, pages 1554 to 1556. In such apparatus, a cryostat under reduced pressure is replenished under normal pressure from a storage vessel, by means of a manually operated expansion or relief valve.

The principal object of the present invention is to provide new and improved apparatus for replenishing liquid helium. The apparatus of the present invention replenishes helium baths which are under normal pressure, increased pressure or overpressure, or reduced pressure or underpressure. The apparatus of the present invention is of very simple structure and operates at a high safety factor. The apparatus of the present invention replenishes liquid helium automatically, and with efficiency, effectiveness and reliability.

The apparatus of the present invention includes a superconducting magnetic coil in a cryostat at the end of a helium siphon which connects the cryostat with a storage vessel. The cryostat includes an inlet valve which is magnetically controlled by the magnetic coil in accordance with the level of helium. The exhaust outlet of the storage vessel has an overflow valve for maintaining at least a nearly constant overpressure in said storage vessel.

The superconducting coil functions simultaneously as a level sensor for the liquid helium and as an operational device for the valve which controls the supply of liquid helium to the cryostat. When operation commences, the cryostat is temporarily empty and the superconducting magnetic coil, which is connected to and energized by a voltage source during operation, is warm and conducts current normally. Due to the high ohmic resistance of the winding of the superconducting coil, a very small current flows in the coil, producing only a weak magnetic field during normal current flow. Therefore, the magnetically controlled valve at the end of the helium siphon in the cryostat is open. Due to the constant adjustment of the overpressure in the storage vessel by the overflow valve at the exhaust outlet of said storage vessel, liquid helium flows through the siphon into the cryostat for the period of time it takes the superconducting magnetic coil to reach the transition or critical temperature and become superconductive, due to the declining temperature caused by the rising level of helium in the cryostat. Since the ohmic resistance of the winding of the superconducting coil is eliminated when said coil is in a superconductive condition or state, the current flow through said coil increases, and thereby the magnetic field produced by said coil increases. The magnetically operated valve at the end of the siphon in the cryostat is then closed by the magnetic field produced by the superconducting coil and the supply of liquid helium to the cryostat is interrupted or stopped. The replenishing process recommences when the level of liquid helium in the cryostat has receded or decreased so far that the superconducting magnetic coil again becomes electrically normal conducting.

In accordance with the present invention, apparatus for replenishing liquid helium in a cryostat from a storage vessel comprises a helium siphon having one end in the storage vessel and its other end in the cryostat for transferring liquid helium from the storage vessel to the cryostat. An inlet valve at the other end of the helium siphon in the cryostat controls the flow of liquid helium into the cryostat. A superconducting magnetic coil device in operative proximity with the inlet valve in the cryostat controls the operation of the inlet valve in accordance with the conducting condition of the superconducting coil device, the conducting condition being determined by the level of liquid helium in the cryostat. An exhaust outlet including an overflow valve is in the storage vessel for maintaining a substantially constant overpressure in the storage vessel. The inlet valve includes a valve head. The superconducting magnetic coil device comprises an electrically conducting coil, a core of soft magnetic material coaxially movably positioned in the coil for movement in axial directions and a coupling coupling the valve head to the core for movement therewith. A coil casing means encloses the superconducting magnetic coil device and has a plurality of apertures formed therethrough. A sensor is mounted on the superconducting magnetic coil device and extends farther into the cryostat than the superconducting coil device. The sensor comprises material having good heat conducting characteristics. The helium siphon comprises a vacuum-housed siphon having exhaust-cooled radiation protection.

In one embodiment of the invention, the core of superconducting magnetic coil device has an axial bore formed therethrough and the inlet valve includes a valve seat for the valve head thereof. The helium siphon comprises a liquid helium conducting conduit which extends farther into the cryostat than the helium siphon through the axial bore through the core and terminates at the valve seat of the inlet valve. A valve housing encloses the inlet valve and has the valve head formed therein. The valve housing has walls having a plurality of apertures formed therethrough. A coupling affixes the valve housing to the superconducting magnetic coil device farther into the cryostat than the helium siphon. The helium siphon comprises a helium exhaust conduti. Electrically conductive leads extend through the helium exhaust conduit to the coil of the superconducting magnetic device for energizing the coil. Heat insulation encases the part of the liquid helium conducting conduit of the helium siphon which extends farther into the cryostat than the helium siphon. Each of the apertures of the valve housing has a diameter of approximately $\frac{1}{1000}$ mm. The heat insulation comprises a vacuum jacket.

In another embodiment of the invention, a valve housing encloses the inlet valve. The inlet valve includes a valve seat for the valve head thereof. The helium siphon comprises a liquid helium conducting conduit which extends further into the cryostat than the helium siphon outside the coil of the superconducting magnetic coil device and terminates in proximity with the valve seat of the inlet valve.

In still another embodiment of the invention, the helium siphon comprises a terminal member at the other end of the helium siphon in the cryostat sealing the siphon in a gas-light manner and a liquid helium conducting conduit terminating at the terminal member. The inlet valve includes a valve seat formed in the terminal member for the valve head of the inlet valve. A coil support mounts the superconducting magnetic coil device and the valve head farther into the cryostat than the helium siphon. The core of the superconducting magnetic core device has an axial bore formed therethrough. The coil support comprises a coil casing enclosing the superconducting magnetic coil device and affixed to the terminal member of the helium siphon. A chamber is formed in the coil casing in proximity with the terminal member of the helium siphon. A helium output pipe extends from the chamber through the axial bore through the core of the superconducting magnetic coil device. A valve spindle having the valve head of the inlet valve mounted at one end thereof, extends through the helium outlet pipe and is affixed to the core of the superconducting magnetic coil device at the other end thereof. The coil support further comprises a vacuum housing in the coil casing enclosing the chamber and enclosing the helium outlet pipe. The coil casing has a plurality of apertures formed therethrough in the area of the valve seat of the inlet valve. The valve spindle is affixed to the core of the superconducting magnetic coil device by a guide member affixed at one end to the core and sealed at its other end by a porous plate. The valve spindle is affixed to the porous plate.

In a preferred embodiment of the apparatus of the present invention, the superconducting magnetic coil has a core of soft-magnetic material around which said coil is positioned and which is mechanically coupled to the valve cone of the inlet valve. The core is movably mounted coaxially within the superconducting coil. When the superconducting coil is in a superconducting condition, the core thereof is drawn into said coil by the magnetic field and the valve is closed by the valve cone which is moved against and into the valve seat by said core. During the transition of the superconducting coil to the normal conducting condition, the valve is opened again by a return spring, for example.

In one embodiment of the present invention, the liquid-conducting conduit of the helium siphon may be led through an axial or central bore through the soft-magnetic core of the superconducting magnetic coil and may end in a valve seat which fits the valve cone. The soft-magnetic core may be affixed to the upper portion of the valve housing and the valve cone may be affixed to the bottom plate of the valve housing. The walls of the valve housing are provided with apertures formed therethrough and having a diameter in the order of magnitude of $\frac{1}{1000}$ mm. The entire valve housing is movable with respect to the valve seat. The very fine apertures or bores through the walls of the valve housing permit the helium to drip from the valve in very small drops, so that a short period only is required for adjusting the temperature balance. Due to the overpressure in the storage vessel, the replenished liquid has a somewhat higher temperature than the liquid helium bath in the cryostat.

In another embodiment of the present invention, the liquid-conducting conduit of the siphon is positioned along the outside of the superconducting magnetic coil and terminates above the valve seat in the valve housing.

The liquid-conducting conduit of the helium siphon is preferably heat-insulated up to the valve seat or valve housing relative to its surroundings. Insulation against heat may be provided, for example, by a vacuum packet or by a synthetic envelope such as, for example, of polyethylene terephthalate foil. The heat insulation may prevent heat contact between the helium vapor above the liquid helium level in the cryostat and the liquid-conducting conduit of the siphon, on the one hand, and on the other hand, it may prevent cooling of the superconducting magnetic coil by the helium in said conduit. The prevention of such cooling of the superconducting coil by helium vapor prevents premature closing of the valve.

In another preferred embodiment of the present invention the liquid-conducting conduit of the helium siphon terminates in an end component which seals said siphon in a gas-tight manner. The end component may be developed as a valve seat. The superconducting magnetic coil, the soft-magnetic core of said super-conducting coil and the valve cone coupled or affixed thereto are positioned below the end component. The superconducting magnetic coil is coupled or affixed to the end component via a tube having a hollow chamber between said end component and said superconducting magnetic coil. The hollow chamber of the tube terminates in a helium discharge tube which passes through an axial or central bore of the soft-magnetic core of the superconducting magnetic coil. A valve spindle is connected to the soft-magnetic material core and carries the valve cone. The valve spindle passes through the helium discharge tube. The hollow chamber of the tube and the helium discharge tube are preferably enclosed in a vacuum housing, which provides heat insulation. Furthermore, the valve spindle may be affixed to a porous plate which is connected to the soft-magnetic core.

Liquid helium from the helium discharge tube may enter the inner chamber of the cryostat through the porous plate. The tube which couples the superconducting magnetic coil to the end component of the helium siphon preferably has small holes, apertures or openings formed therethrough in the area of or at the height of the valve seat and above the superconducting coil. This embodiment of the apparatus of the present invention has the advantage that the superconducting magnetic coil is positioned at the lowest point of the end of the helium siphon positioned in the cryostat and is thus immersed in the liquid helium in the cryostat.

Known types of vacuum jacket siphons are suitable as the helium siphon of the present invention. In order to reduce helium losses by heat irradiation to the liquid-carrying inside conduit or tube of the helium siphon, it is, however, preferable to provide a vacuum jacket siphon with exhaust-cooled radiation protection. In such a siphon, the helium-conducting conduit or tube of the siphon is surrounded by a heat shield. The heat shield comprises a material with good heat conducting properties such as, for example, copper. The heat shield is connected in a good heat-conductive manner with an exhaust pipe which ends inside the vacuum housing. The helium exhaust or helium vapor is drawn off from the cryostat via the exhaust pipe, which is preferably made of copper, and is utilized to precool the siphon. The electrical leads for the superconducting magnetic coil are preferably introduced into the cryostat through the exhaust pipe of the siphon.

The superconducting magnetic coil may be enclosed in an encasing tube or jacket having a plurality of small apertures, holes or openings formed therethrough. The encased superconducting coil has a better defined temperature range than if it were freely positioned in the vapor chamber. The helium in the inner chamber of the encasing tube or jacket may flow through the apertures, holes or openings of said encasing tube. On the other hand, the liquid helium may easily reach the inside of the encasing tube through the same apertures, holes or openings.

The apparatus of the present invention may be so designed that the superconducting magnetic coil only reaches the critical temperature and becomes superconducting when it is immersed in the helium, or that the superconducting magnetic coil becomes superconducting prior to immersion in the helium, but as soon as it approaches the level of the helium, due to the temperature gradient which is established above the liquid helium. The latter possibility affords the advantages of a calm liquid surface and a low energy supply to the helium bath. If the superconducting magnetic coil is to become superconducting only upon being immersed in the helium, beneath the level of the helium, then a superconductor material of low critical temperature is preferably utilized as the coil. If the superconducting magnetic coil is to become superconducting prior to immersion, then a superconducting material of higher critical temperature is preferably utilized. Suitable superconductor materials are, for example, vanadium, which has a critical temperature of 5.3° K., niobium, which has a critical temperature of 9.15° K., niobium alloys, which comprise, for example, niobium and 25 atom percent of zirconium, which has a critical temperature of scarcely 11° K., and superconductive intermetallic compounds such as, for example, niobium-tin ($Nb_3Sn$), which has a critical temperature of about 18° K.

The member which supports or carries the superconducting magnetic coil may comprise, in accordance with the desired cooling properties, metal having good heat conducting characteristics or hard fiber material having poor heat conducting chaacteristics. The superconducting magnetic coil may be changed to its superconducting condition prior to immersion in the helium or beneath the level of the helium, by affixing to said coil metal sensors having good heat conducting characteristics and extending into the cryostat. When the sensor or sensors is or are immersed in the helium, the superconducting coil may be cooled up to the critical temperature, due to the heat conductivity of said sensor or sensors.

The overpressure over or above the helium in the storage vessel, which is necessary for the transfer of helium through the helium siphon, should be several hundred millimeter water columns. A suitable overflow valve which permits the automatic adjustment and maintenance of a specific predetermined overpressure in the storage vessel, is known. In such an overflow valve, the inlet opening, which is connected with the exhaust outlet of the storage vessel, is also connected with the inside chamber of a spring bellows. One end of the bellows is in the valve housing and the other end is affixed to a sealing member. The valve spindle is adjustably seated in the sealing member in a gas-tight manner, and the valve seat is at the valve housing. The spring bellows is enclosed by a housing portion affixed to the valve housing. The inner chamber of the housing portion may be sealed against the atmosphere in a gas-tight manner by a cap, enclosing also the valve spindle. The cap comprises a sealing valve. The overflow valve opens for a short period, when the pressure in the storage vessel exceeds the pressure on the outside of the spring bellows. The sensitivity or response characteristic of the valve may be varied by movement of the valve spindle, since variable forces are required to extend or expand the spring bellows in accordance with compression of said bellows. Since the valve housing may be sealed, a preselected constant reference pressure may be established or adjusted.

In order that the present invention may be readily carried into effect, it will now be described with reference to the accompanying drawings, wherein.

In the figures, the same components are identified by the same reference numerals.

Figure 1:
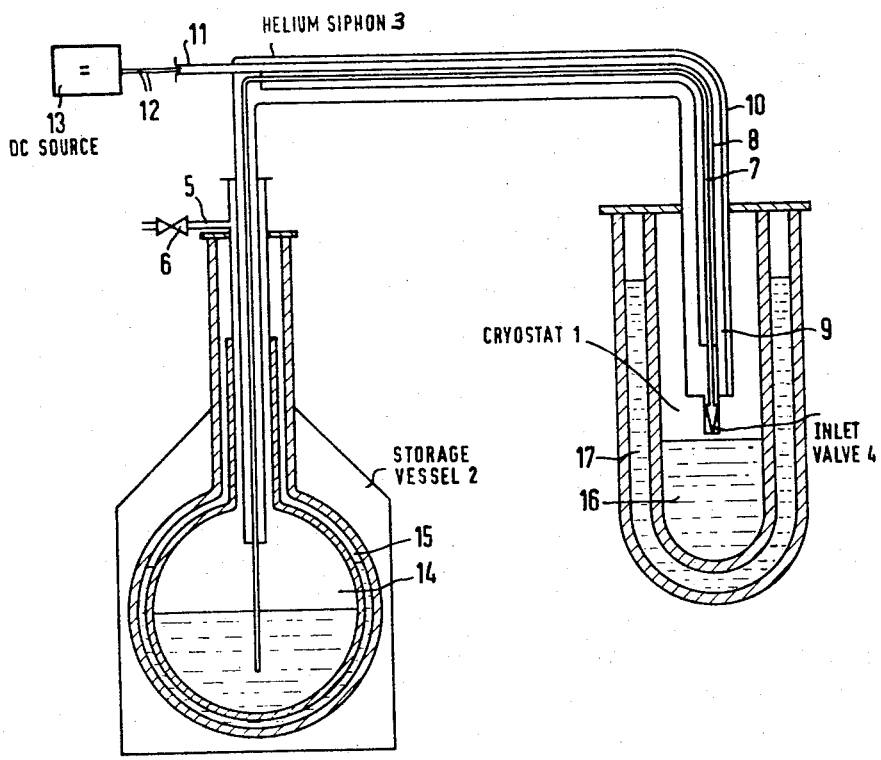
FIG. 1 is a schematic diagram, partly in section, of an embodiment of the apparatus of the present invention.

In FIG. 1, a cryostat is linked, coupled or connected to a helium storage vessel 2 by an exhaust-cooled vacuum housed helium siphon 3. A valve or inlet valve 4, which is controlled in operation by a superconducting magnetic coil (not shown in FIG. 1) is positioned at the end of the siphon 3 located in the cryostat 1. An overflow valve 6 is positioned in an exhaust outlet 5 of the storage vessel 2 and permits the maintaining of a constant adjustable overpressure in said storage vessel. The overpressure is required for the transfer of liquid helium from the storage vessel 2 to the cryostat 1. When magnitude of the adjusted pressure is exceeded, helium gas is released via the overflow valve and flows back into the helium recovery system (not shown in FIG. 1).

The siphon 3 comprises a liquid helium conducting conduit, tube or pipe 7 surrounded by or enclosed in a radiation-protection tube, pipe, housing or enclosure 8 which is cooled by the helium exhaust escaping from the cryostat 1 through an exhaust pipe or tube 9. The exhaust tube 9 is coupled, joined or connected to the radiation-protection pipe 8 in heat conductive relation. The helium siphon 3 further comprises a vacuum housing 10. The helium exhaust is drawn from the helium siphon 3 by an exhaust member, pipe, tube or conduit 11, above the storage vessel 2, and may be supplied to the helium recovery system (not shown). Electrically conductive leads 12, which connect a DC source 13 with the superconducting magnetic coil (not shown in FIG. 1, but positioned at the inlet valve 4) are introduced into the cryostat 1 through the exhaust pipe 9. In order to maintain the clarity of illustration, the entire lengths of lead 12 are not shown in the figures.

Helium is stored in a vacuum housing vessel 14 in the storage vessel 2. To provide radiation protection, the storage vessel 2 is surrounded by or enclosed in an additional nitrogen-filled vacuum housing vessel 15. The helium conducting conduit 7 of the helium siphon 3 supplies the liquid helium to an inner vacuum chamber housing, vessel or container 16 of the cryostat 1. The vacuum housing 16 is surrounded by or enclosed in another nitrogen-cooled vacuum chamber, housing, vessel or container 17. A specimen or device to be cooled such as, for example, a measuring or calibrating sample, or a superconducting coil, is positioned in the lower part of the housing 16 of the cryostat 1, and is not illustrated in the figures in order to maintain the clarity of illustration.

Figure 2:
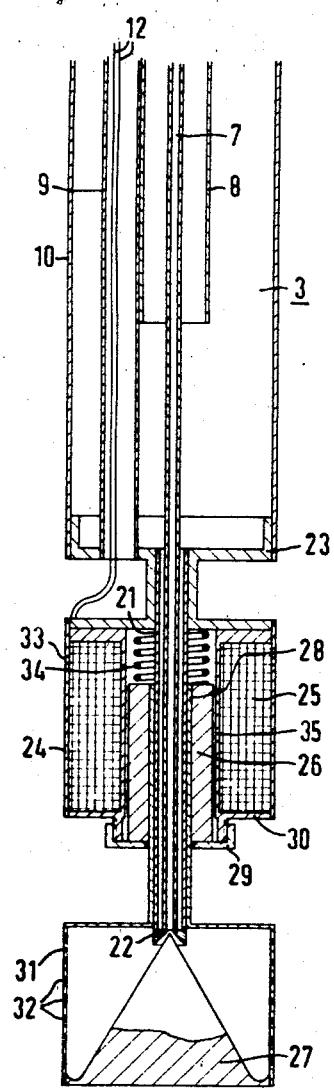
FIG. 2 is a simplified diagram, partly in section, of an embodiment of an automatically controlled inlet valve of the apparatus of the present invention.

FIG. 2 illustrates an embodiment of the inlet valve 4 of the apparatus of FIG. 1, including a superconducting magnetic coil for controlling the operation of said valve. The liquid helium conducting conduit 7 is enclosed in or surrounded by the vacuum housing 10 which is narrowed down in diameter or tapered off in its lower portion 21. The liquid helium conducting conduit 7 of the helium siphon 3 ends in a valve seat 22 at its end in the cryostat 1. The liquid helium conducting conduit 7 is heat-insulated by the small diameter or tapered vacuum housing 21. An end member 23, having an annular groove formed therein is formed in the vacuum housing 10 at the area where its diameter narrows down to that of the vacuum housing 21, and the exhaust pipe 9, which cools the radiation protection pipe 8, terminates at said end member.

The exhaust from the cryostat 1 flows into the exhaust pipe 9 via the annular groove formed in the end member 23. A housing tube, container or casing 24 encloses the superconducting magnetic coil 25. The upper sealed or closed end of the casing 24 is affixed to the end member 23 by any suitable means such as for example, threaded engagement or coupling. The superconducting magnetic coil 25 has a soft-iron core 26 which is enclosed by said coil and which is movably mounted for movement in axial directions. The core 26 is connected, affixed or coupled to a valve core 27. The liquid helium conducting conduit 7 of the helium siphon 3 is positioned in and passes through an axial or central bore 28 formed through the soft iron core 26 of the superconducting magnetic coil 25. The core 26 is coaxially positioned in the inside of the superconducting coil 25.

An outer support or abutment 29 is movably mounted for positional adjustment in an axial direction on a lower sealing member 30 of the casing 24. The support 29 may thus be threadedly engaged or coupled with the lower sealing member 30. The support 29 supports the core 26 of the superconducting coil 25 and thus determines the maximum movement of said core and therefore the maximum opening of the inlet valve.

A valve housing 31 has an upper portion which is connected, affixed or coupled to the soft-iron core 26 of the superconducting coil 25. The valve cone 27 of the inlet valve is mounted on the bottom member of the valve housing 31. A plurality of very fine holes, apertures or bores 32 are formed through the walls of valve housing 31. Each of the apertures 32 has a diameter of approximately one micron. The valve housing 31 provides or promotes a phase separation between the liquid helium and the gaseous helium.

Liquid helium emerges from the bores 32 as tiny drops, so that little time is required for adjusting the equilibrium of the temperature. Due to the overpressure of, for example 50 torr, in the storage vessel 2 (FIG. 1), the replenished helium will have a temperature of about 4.4° K. and must be cooled to the normal boiling temperature of 4.2° K. of the bath in the cryostat 1.

A plurality of small holes, apertures or bores 33 are formed through the upper portion of the walls of the casing 24. A return spring 34 is coaxially positioned within the superconducting coil 25 between the end member 23 of said casing and the soft-iron core 26 and abutting said end member and said core. The spring 34 presses or urges the soft-iron core 26 against the support or abutment 29, when the superconducting magnetic coil 25 is in a normal conducting condition, thereby opening the inlet valve.

During the transition of the superconducting magnetic coil 25 from the normal to the superconducting condition, the soft-iron core 26 is drawn up or pulled into said coil and moves the valve cone 27 with it until said valve cone is pressed against or abuts the valve seat 22, thereby closing the inlet valve. To facilitate axial movement of the soft-iron core 26, a coil tube 35 is coaxially provided in the superconducting coil 25 and around said core. Guide rings such as, for example, piston rings, (not shown in the figures) may be provided between the inside of the coil tube 35 and the outside of the soft-iron core 26. Care must be taken to utilize guide ring materials having approximately the same thermic expansion coefficient as the soft-iron core 26, so that the guidance of said soft-iron core is not adversely affected during the cooling of the apparatus.

The ends of the electrical leads 12 of the superconducting magnetic coil 25 in the exhaust pipe 9 may be connected to said superconducting magnetic coil via an appropriate aperture, hole, bore or opening formed through the lower part of the end member 23 and through the upper part of the casing 24. The inlet valve illustrated in FIG. 2 is particularly compact, with the superconducting magnetic coil 25, the casing 24, the soft-iron core 26, the return spring 34, the abutment 29 and the valve housing 31 and valve cone 27 all being formed in a single compact unit.

Figure 3:
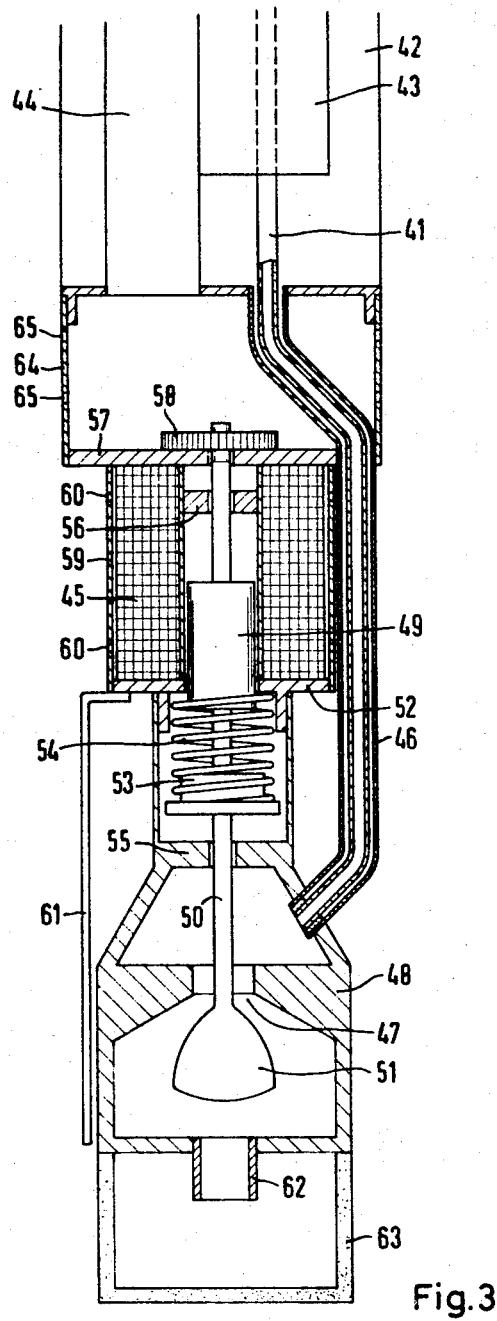
FIG. 3 is a simplified diagram, partly in section, of another embodiment of the automatically controlled inlet valve of the apparatus of the present invention.

FIG. 3 illustrates another embodiment of the automatic inlet valve 4 of the apparatus of FIG. 1. The embodiment of FIG. 3 is especially suitable for use with a helium siphon which has a liquid helium conducting conduit, tube, pipe, or the like 41 which does not extend axially in a vacuum housing tube, conduit or chamber 42. The helium siphon includes a radiation-protecting tube, pipe, conduit, housing or member 43 and a helium exhaust pipe, member, tube or container 44. The lower portion of the liquid helium conducting conduit 41 extends along the outside of the superconducting magnetic coil 45 and is covered by, surrounded by or encased in a vacuum housing or jacket 46 which provides heat insulation. The liquid helium conducting conduit 41 terminates at an area above a valve seat 47 in a valve housing 48. The superconducting magnetic coil 45 has a coaxial positioned soft-iron core 49 movably mounted inside said coil for movement in axial directions. The core 49 is affixed or coupled to a valve cone 51 by a valve spindle 50.

A return spring 54 is coaxially positioned around the valve spindle 50. The soft-iron core 49 is coaxially mounted on the valve spindle 50. The return spring 54 is positioned between the bottom member 52 of a casing 59 and an abutment 53 coaxially mounted on the valve spindle 50, and abuts said bottom member and said abutment. The casing or housing 59 encases or houses the superconducting magnetic coil 45 and is coaxial with said superconducting coil. The valve spindle 50 is guided by a guide ring 55 in the valve housing 48 and a guide ring 56 inside and coaxial with the superconducting magnetic coil 45. An adjustable, axially movable, limit member 58 is coaxially movably mounted on the valve spindle 50 for movement in axial directions at the upper end of said valve spindle, by threaded coupling or engagement, for example. The upper end of the valve spindle 50 passes through and is guided by an upper cover member 57 of the coil casing 59. The maximum valve opening is determined by the position of the limit member 58 on the valve spindle 50, since when said limit member abuts the upper cover member 57 of the coil casing 59 the valve cone 51 is prevented from further downward movement.

The casing 59 of the superconducting coil 45 has a plurality of small diameter bores, apertures or openings 60 formed therethrough. A copper sensor 61 extends from the casing 59 and is immersed in the rising helium before the superconducting magnetic coil 45 is so immersed. The sensor 61 thus may effect a transition of said superconducting coil from the normal conducting condition to the superconducting condition, since it conducts heat before said superconducting coil reaches the liquid helium.

The valve housing 48 has an escape opening, aperture or outlet 62 in its bottom. A cover 63 of substantially cylindrical configuration having a closed base at the bottom extends from the bottom of the valve housing 48 and covers, encloses or houses the escape outlet 62. The cover 63 comprises sintered metal such as, for example, of sintered bronze. During operation of the apparatus, the sintered cover 63 effects a phase separation between the helium gas or vapor and the helium liquid, thus preventing the formation of helium gas eddy currents which may cause considerable cooling losses.

The upper cover member 57 of the coil casing 59 is coupled, affixed or connected to the vacuum housing 42 of the helium siphon by a connecting or support member, housing or tube 64. A plurality of holes, bores or apertures 65 are formed through the conecting tube 64. The helium exhaust flows into the connecting tube 64 through the bores 65 therethrough and may reach the exhaust pipe 44 of the helium siphon through said connecting tube. The electrical leads for the superconducting magnetic coil 45 may extend through the helium exhaust pipe 44 from the cryostat.

Figure 4:
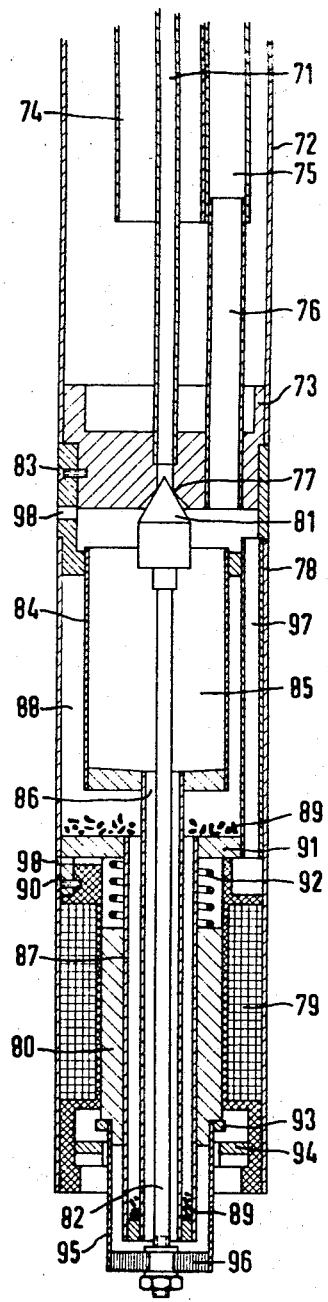
FIG. 4 is a simplified diagram, partly in section, of still another embodiment of the automatically controlled inlet valve of the apparatus of the present invention.

FIG. 4 illustrates still another embodiment of the automatic inlet valve 4 of the apparatus of FIG. 1. In the embodiment of FIG. 4, the superconducting magnetic coil is positioned below the valve seat. In FIG. 4, a liquid helium conducting conduit 71 is enclosed by, encased by, housed in, or surrounded by a vacuum jacket, tube or housing 72. An end of the housing 72 is sealed in a gas-tight manner by a terminal or end member 73. A radiation protection tube, housing, member or conduit 74 encases, encloses or surrounds the liquid helium conducting conduit 71 of the helium siphon. The radiation protection tube 74 is connected to a helium exhaust pipe, conduit or member 75 in good heat conducting connection. The helium exhaust pipe 75 extends through the vacuum chamber 72 and is preferably soldered to the radiation protection tube 74. The exhaust pipe 75 is linked, connected or coupled to the terminal member 73 of the helium siphon, where it terminates, via an intermediate member, conduit, tube, pipe or the like 76. The intermediate pipe 76 comprises poor heat conducting material. The liquid helium conducting conduit 71 terminates at the terminal or end member 73.

A valve seat 77 is formed in the terminal member 73 at the terminal outlet of the liquid helium conducting conduit 71. The terminal member 73 of the siphon is of slightly narrower diameter or is slightly tapered at its lower portion. A tube, conduit, member, housing or casing 78 is coaxially positioned around and over the tapered part of the terminal member 73. The casing 78 encases, encloses or houses a superconducting magnetic coil 79, a soft-iron core 80 and a valve spindle 82. The soft-iron core 80 is coaxially movably positioned in the superconducting coil 79 and is mounted therein for movement in axial directions. The valve spindle 82 extends coaxially through an axial aperture formed through the soft-iron core 80. A valve core 81 is coaxially affixed to the valve spindle 82 at the upper end of said valve spindle. The coil casing 78 functions to support and house the superconducting magnetic coil 79 and is affixed to the terminal member 73 by any suitable means such as, for example, bolts or screws, one of which, 83, is shown in FIG. 4.

A tube, casing, housing or member 84, which forms and encloses a chamber 85 is mounted in the upper part of the coil casing 78 just below the valve seat 77. A helium discharge or outlet member, tube or pipe 86, of considerably smaller diameter than the housing 84, extends from the closed lower end of said housing. A vacuum housing encases, houses or surrounds the housing 84 and the pipe 86 and is provided by the coil casing 78 around the housing 84 and a core tube or conduit 87, which is coaxially positioned through the soft-iron core 80, around the pipe 86. The vacuum housing around the housing 84 and the pipe 86 comprises an area or space 88 around said housing and said pipe.

The evacuated area 88 is not evacuated during the production of the valve, but is solder-sealed under normal pressure. The air present in the sealed space or area 88 is subjected, during the cooling process, to the effect of active carbon 89, which is provided in said area or space prior to its sealing by soldering. Since the air and active carbon are heated during the soldering process, a good vacuum is provided during the cooling of the apparatus.

The vacum housing provides heat insulation between the superconducting magnetic coil 79 and the helium discharge pipe 86, as well as the chamber 85.

The superconducting magnetic coil 79 and its soft-iron core 80 are fitted in the lower portion of the coil casing 78. The superconducting magnetic coil 79 may be fixed in position in the coil casing 78 by any suitable means such as, for example, bolts or screws, of which one, 90, is shown in FIG. 4. The core tube 87 and the helium discharge pipe 86 are positioned in the soft-iron core 80, as described. A return spring 92 is coaxially positioned around the core tube 87 inside the supporting member for the superconducting coil 79 and extends between and abuts the soft-iron core 80 and a plate member 91 which supports said core tube in the coil casing 78.

A stop ring 93 is mounted on and around the soft-iron core 80 at the lower end of said core. The coil casing 78 comprises an abutment collar 94 which is coaxially movably positioned in said coil casing for movement in axial directions. The abutment collar 94 is adjustably movable in the coil casing 78 by any suitable means such as, for example, threaded engagement or coupling. The abutment collar 94 is adjusted in axial position to determine the lowermost position of the stop ring 93, when said stop ring abuts said abutment collar, thereby determining the maximum movement of the core 80 and thus the maximum valve opening.

A guide pipe, tube, housing or member 95 extends coaially downward from the lower end of the soft-iron core 80 and is affixed to said core under the stop ring 93. The bottom of the guide member 95 is closed or sealed by a porous plate, member or cover 96 which comprises, for example, sintered material. The lower end of the valve spindle 82 inside the helium outlet pipe 86, is in threaded engagement or coupling with the porous plate 96, so that said valve spindle is mechanically coupled, linked or connected with the soft-iron core 80 by means of the guide member 95.

The electrically conductive leads (not shown in FIG. 4) for the superconducting magnetic coil 79 extend from the outside through the helium discharge tube 75 and are connected to said coil through a duct 97 on the inside of the coil casing 78 between the housing 84 and said coil casing. A plurality of bores, apertures or holes 98 are formed through the coil casing 78 in the area of the valve seat 77 above the superconducting magnetic coil 79. The apertures 98 are distributed around the circumference of the coil casing 78 and gaseous helium may escape from the inner chamber through said apertures.

While the apparatus is in operation, liquid helium is transferred through the liquid helium conducting conduit 71 of the siphon and flows, through the valve, which valve comprises the valve seat 77 and the valve cone 81, into the vacuum-insulated chamber 85 in the coil casing 78. In the chamber 85, helium gas formed within the siphon and during the passage through the valve may separate from the helium liquid and such helium gas immediately enters the exhaust pipe 75. The liquid helium flows from the chamber 85 through the vacuum-insulated helium discharge pipe 86 and into the cryostat through the porous plate 96.

When the helium level in the cryostat has risen to a point at which the lower end of the coil casing 78 is immersed in liquid helium, such liquid helium flows through the annular groove, space or separation between the guide member 95 and the abutment collar 94 into said coil casing and cools the superconducting magnetic coil 79. When the critical temperature is decreased, the superconducting coil 79 becomes superconducting. When the superconducting coil 79 becomes superconducting, it attracts its soft-iron core 80, which is then drawn upward into said coil against the force of the return spring 92. The valve spindle 82 and the valve core or valve head 81 mounted thereon move upward with the soft-iron core 80 and close the valve.

An advantage of the embodiment of FIG. 4 of the valve is that the superconducting magnetic coil is positioned at the lowest part of the siphon. The entire unit, comprising the valve and the superconducting coil, is readily and facilely removable. The valve seat 77 is readily accessible and may be serviced, machined or processed again. The processing may involve repolishing, prior to the operation of the apparatus, since the last stage of the assembly of the apparatus consists of threadedly engaging or coupling the valve unit to the siphon.

An advantage of the apparatus of the present invention is that the operation of the valve is completely automatic and only the current conducting leads of the superconducting coil extend out of the cryostat, so that there is substantially no additional transfer of heat into the cryostat. The valve may also be very small in dimensions. In a preferred embodiment of the present invention, the liquid helium conducting conduit of the helium siphon has a diameter of about 3 mm. and the vacuum housing of said siphon has a diameter of approximately 20 to 30 mm. The radiation protection tube and the helium outlet tube are correspondingly or appropriately dimensioned.

In order to facilitate the insertion of the valve-supporting housing into the cryostat, the superconducting coil and the valve should not extend beyond the limiting area determined by the vacuum housing or jacket of the siphon. In accordance with the aforementioned dimensions of the components of the helium siphon, the total diameter of the superconducting coil is preferably about 20 to 30 mm. A suitable current source for the superconducting coil is, for example, a low voltage DC current source such as for example, a 1 volt battery or appropriate storage cell.

The apparatus of the present invention, is primarily suitable for replenishing helium baths which are either under overpressure or under normal pressure. For replenishing helium baths under underpressure, the apparatus of the present invention may be utilized in combination with an appropriate pressure regulating device. If superconducting materials with higher critical points were to be discovered, the apparatus could be utilized for replenishing higher-boiling cooling agents.

While the invention has been described by means of specific examples and in specific embodiments, we do, not wish to be limited thereto, for obvious modifications will occur to those skilled in the art without departing from the spirit and scope of the invention.

We claim:

1. Apparatus for replenishing liquid helium in a cryostat from a storage vessel, said apparatus comprising a helium siphon having one end in said storage vessel and its other end in said cryostat for transferring liquid helium from said storage vessel to said cryostat; inlet valve means at the other end of said helium siphon in said cryostat for controlling the flow of liquid helium into said cryostat; superconducting magnetic coil means in operative proximity with said inlet valve means in said cryostat for controlling the operation of said inlet valve means in accordance with the conducting condition of said superconducting coil means, said conducting condition being determined by the level of liquid helium in said cryostat; exhaust outlet means including overflow valve means in said storage vessel for maintaining a substantially constant overpressure in said storage vessel.

2. Apparatus as claimed in claim 1, wherein said valve means includes a valve head and said superconducting magnetic coil means comprises an electrically conducting coil, a core of soft magnetic material coaxially movably positioned in said coil for movement in axial directions and coupling means coupling said valve head to said core for movement therewtih.

3. Apparatus as claimed in claim 1, further comprising coil casing means enclosing said superconducting magnetic coil means, said coil casing means having a plurality of apertures formed therethrough.

4. Apparatus as claimed in claim 1, further comprising sensor means mounted on said superconducting magnetic coil means and extending further into said cryostat than said superconducting coil means, said sensor means comprising material having good heat conducting characteristics.

5. Apparatus as claimed in claim 1, wherein said helium siphon comprises a vacuum-housed siphon having exhaust-cooled radiation protection.

6. Apparatus as claimed in claim 2, wherein the core of said superconducting magnetic coil means has an axial bore formed therethrough and said valve means includes a valve seat for the valve head thereof, and wherein said helium siphon comprises a liquid helium conducting conduit which extends farther into said cryostat than said helium siphon through the axial bore through said core and terminates at the valve seat of said valve means.

7. Apparatus as claimed in claim 2, further comprising a valve housing enclosing said valve means, and wherein said valve means includes a valve seat for the valve head thereof and said helium siphon comprises a liquid helium conducting conduit which extends farther into said cryostat than said helium siphon outside the coil of said superconducting magnetic coil means and terminates in proximity with the valve seat of said valve means.

8. Appaartus as claimed in claim 2, wherein said helium siphon comprises a terminal member at the other end of said helium siphon in said cryostat sealing said siphon in a gas-tight manner and a liquid helium conducting conduit terminating at said terminal member, and said valve means includes a valve seat formed in said terminal member for the valve head of said valve means, and further comprising coil supporting means mounting said superconducting magnetic coil means and the valve head of said valve means farther into said cryostat than said helium siphon.

9. Apparatus as claimed in claim 6, further comprising a valve housing enclosing said valve means and having said valve head formed therein, said valve housing having walls having a plurality of apertures formed therethrough, and coupling means affixing said valve housing to said superconducting magnetic coil means farther into said cryostat than said helium siphon.

10. Apparatus as claimed in claim 6, wherein said helium siphon comprises a helium exhaust conduit, and further comprising electrically conductive leads extending through said helium exhaust conduit to the coil of said superconducting magnetic means for energizing said coil.

11. Apparatus as claimed in claim 6, further comprising heat insulation means encasing the part of the liquid helium conducting conduit of said helium siphon which extends farther into said cryostat than said helium siphon.

12. Apparatus as claimed in claim 8, wherein the core or said superconducting magnetic coil means has an axial bore formed therethrough and wherein said coil supporting means comprises a coil casing enclosing said superconducting magnetic coil means and affixed to the terminal member of said helium siphon, means forming a chamber in said coil casing in proximity with the terminal member of said helium siphon, a helium outlet pipe extending from said chamber through the axial bore through the core of said superconducting magnetic coil means, and a valve spindle having the valve head of said valve means mounted at one end thereof, extending through said helium outlet pipe and affixed to the core of said superconducting magnetic coil means at the other end thereof.

13. Apparatus as claimed in claim 9, wherein each of said apertures has a diameter of approximately $\frac{1}{1000}$ mm.

14. Apparatus as claimed in claim 9, wherein said helium siphon comprises a helium exhaust conduit, and further comprising electrically conductive leads extending through said helium exhaust conduit to the coil of said superconducting magnetic means for energizing said coil.

15. Apparatus as claimed in claim 11, wherein said heat insulation means comprises a vacuum jacket.

16. Apparatus as claimed in claim 12, wherein said coil supporting means further comprises a vacuum housing in said coil casing enclosing said chamber and enclosing said helium outlet pipe.

17. Apparatus as claimed in claim 12, wherein said coil casing has a pluraltiy of apertures formed therethrough in the area of the valve seat of said valve means.

18. Apparatus as claimed in claim 12, wherein said valve spindle is affixed to the core of said superconducting magnetic coil means by a guide member affixed at one end to said core and sealed at its other end by a porous plate, said valve spindle being affixed to said porous plate.

References Cited

UNITED STATES PATENTS

| | | | |
|---|---|---|---|
| 3,199,303 | 8/1965 | Haumann et al. | 62—49 |
| 3,302,417 | 2/1967 | Cowans | 62—49 |
| 3,358,472 | 12/1967 | Klipping | 62—51 X |
| 3,364,687 | 1/1968 | Kolm | 62—51 X |

LLOYD L. KING, *Primary Examiner.*

U.S. Cl. X.R.

62—49, 55